(12) United States Patent
Koo et al.

(10) Patent No.: US 10,996,520 B2
(45) Date of Patent: May 4, 2021

(54) DISPLAY DEVICE COMPRISING AN INSULATING LAYER DISPOSED BETWEEEN A FIRST PIXEL ELECTRODE IN A FIRST PIXEL AREA AND A SECOND PIXEL ELECTRODE IN A SECOND PIXEL AREA

(71) Applicant: Samsung Display Co., Ltd, Yongin-si (KR)

(72) Inventors: Bonyong Koo, Asan-si (KR); Chongchul Chai, Seoul (KR); Yujin Lee, Suwon-si (KR); Yongkoo Her, Yongin-si (KR)

(73) Assignee: Samsung Display Co., Ltd.

( * ) Notice: Subject to any disclaimer, the term of this patent is extended or adjusted under 35 U.S.C. 154(b) by 263 days.

(21) Appl. No.: 15/442,529

(22) Filed: Feb. 24, 2017

(65) Prior Publication Data

US 2017/0363916 A1 Dec. 21, 2017

(30) Foreign Application Priority Data

Jun. 16, 2016 (KR) .................. 10-2016-0075023

(51) Int. Cl.
| | |
|---|---|
| *G02F 1/1343* | (2006.01) |
| *G02F 1/1333* | (2006.01) |
| *G02F 1/1362* | (2006.01) |
| *G02F 1/1368* | (2006.01) |
| *G02F 1/1335* | (2006.01) |

(52) U.S. Cl.
CPC ...... *G02F 1/134309* (2013.01); *G02F 1/1368* (2013.01); *G02F 1/13439* (2013.01); *G02F 1/133345* (2013.01); *G02F 1/136227* (2013.01); *G02F 1/136286* (2013.01); *G02F 1/133512* (2013.01); *G02F 2201/121* (2013.01); *G02F 2201/122* (2013.01); *G02F 2201/123* (2013.01)

(58) Field of Classification Search
CPC ... G02F 2201/122; G02F 2001/133519; G02F 2001/133357
See application file for complete search history.

(56) References Cited

U.S. PATENT DOCUMENTS

| | | | |
|---|---|---|---|
| 8,692,756 B2 | 4/2014 | Hara et al. | |
| 2009/0290080 A1* | 11/2009 | Horiuchi et al. | ........................... G02F 1/136286 349/38 |
| 2011/0194059 A1* | 8/2011 | Yamazaki | ........... G02F 1/13439 349/138 |
| 2013/0057813 A1* | 3/2013 | Jeong | ................ G02F 1/134309 349/110 |

(Continued)

FOREIGN PATENT DOCUMENTS

| | | |
|---|---|---|
| KR | 1019990042230 | 6/1999 |
| KR | 1019990047263 | 7/1999 |

(Continued)

*Primary Examiner* — Paul C Lee
(74) *Attorney, Agent, or Firm* — Innovation Counsel LLP

(57) ABSTRACT

A display device includes: a first substrate and a second substrate including a plurality of pixel areas and opposing each other; a liquid crystal layer between the first substrate and the second substrate; a first pixel electrode on the first substrate; a first insulating layer on the first pixel electrode; and a second pixel electrode on the first insulating layer and in a different pixel area from a pixel area in which the first pixel electrode is disposed.

9 Claims, 14 Drawing Sheets

(56) References Cited

U.S. PATENT DOCUMENTS

| | | | |
|---|---|---|---|
| 2013/0083092 A1* | 4/2013 | Shin | G09G 3/36 |
| | | | 345/690 |
| 2013/0148048 A1* | 6/2013 | Hiratsuka | G02F 1/134363 |
| | | | 349/38 |
| 2013/0271679 A1* | 10/2013 | Sakamoto | G02F 1/133514 |
| | | | 349/33 |
| 2015/0153600 A1* | 6/2015 | Won | H01L 27/127 |
| | | | 349/43 |
| 2016/0284302 A1* | 9/2016 | Tomikawa et al. | G09G 3/3655 |

FOREIGN PATENT DOCUMENTS

| | | | |
|---|---|---|---|
| KR | 1020010017525 | | 3/2001 |
| KR | 1020070072208 | | 7/2007 |
| WO | WO-2015068364 A1 * | 5/2015 | G09G 3/36 |

* cited by examiner

DISPLAY DEVICE COMPRISING AN INSULATING LAYER DISPOSED BETWEEEN A FIRST PIXEL ELECTRODE IN A FIRST PIXEL AREA AND A SECOND PIXEL ELECTRODE IN A SECOND PIXEL AREA

CROSS-REFERENCE TO RELATED APPLICATION

This application claims priority to Korean Patent Application No. 10-2016-0075023, filed on Jun. 16, 2016, and all the benefits accruing therefrom under 35 U.S.C. § 119, the content of which in their entirety is herein incorporated by reference.

BACKGROUND

1. Field

Exemplary embodiments relate to a display device and a method of manufacturing the display device, and more particularly, to an ultra-high resolution display device and a method of manufacturing the ultra-high-resolution display device

2. Description of the Related Art

Display devices are classified into a liquid crystal display ("LCD") device, an organic light emitting diode ("OLED") display device, a plasma display panel ("PDP") device, an electrophoretic display ("EPD") device, and the like, based on a light emitting scheme thereof.

Among the various types of the display device, an LCD device typically includes two substrates including a pixel electrode and a common electrode respectively formed thereon and a liquid crystal layer interposed between the two substrates. Upon applying a voltage to the pixel electrode and the common electrode, liquid crystal molecules of the liquid crystal layer are rearranged, such that an amount of transmitted light may be controlled.

In recent times, demand on display devices having large size and high resolution is increasing. In particular, demand on display devices having an ultra-high resolution of about 2000 pixel per inch (ppi) or higher, beyond a high resolution of about 300 ppi or higher, is increasing.

As resolution of display devices increases, size of a unit pixel electrode and distance among the unit pixel electrodes should decrease. However, due to a resolution limit of an exposure which patterns the pixel electrode, the pixel electrodes may not be spaced apart from one another at less than a predetermined distance and thus there is a difficulty in realizing an ultra-high resolution display device.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments are directed to a display device including pixel electrodes spaced apart from one another at a distance less than or equal to a resolution limit of an exposure and to a method of manufacturing the display device.

According to an exemplary embodiment, a display device includes: a first substrate and a second substrate including a plurality of pixel areas and opposing each other; a liquid crystal layer between the first substrate and the second substrate; a first pixel electrode on the first substrate; a first insulating layer on the first pixel electrode; and a second pixel electrode on the first insulating layer and in a different pixel area from a pixel area in which the first pixel electrode is disposed.

The first pixel electrode and the second pixel electrode may have substantially a same shape.

The display device may further include a gate line extending in a first direction and a data line extending in a second direction which intersects the first direction. A distance between the first pixel electrode and the second pixel electrode may be less than a width of the data line in the first direction.

At least a portion of the first pixel electrode and at least a portion of the second pixel electrode may overlap the data line.

A distance between the first pixel electrode and the second pixel electrode may be in a range of about 0.3 μm to about 1.0 μm.

The display device may further include a common electrode on the first substrate, the common electrode insulated from the first pixel electrode.

The display device may further include a common electrode on the second substrate.

The display device may further include: a second insulating layer on the second pixel electrode; and a third pixel electrode on the second insulating layer, the third pixel electrode disposed in a different pixel area from pixel areas in which the first pixel electrode and the second pixel electrode are disposed.

The display device may further include a first black matrix extending along the gate line.

The display device may further include a second black matrix extending along the data line.

The second black matrix may have a smaller width than a width of the data line.

According to an exemplary embodiment, a method of manufacturing a display device includes: preparing a first substrate including a plurality of pixel areas; forming a film structure on the first substrate, the film structure including a plurality of thin film transistors; defining a first contact hole in the film structure, the first contact hole exposing a portion of a first thin film transistor of the thin film transistors; forming a first pixel electrode connected to the first thin film transistor through the first contact hole; coating a first insulating layer on the first substrate on which the first pixel electrode is formed; defining a second contact hole in the film structure and the first insulating layer, the second contact hole exposing a portion of a second thin film transistor of the thin film transistors; and forming a second pixel electrode connected to the second thin film transistor through the second contact hole. The first pixel electrode is formed in a different pixel area from a pixel area in which the second pixel electrode is formed.

According to an exemplary embodiment, a method of manufacturing a display device includes: preparing a first substrate including a plurality of pixel areas; forming a film structure on the first substrate, the film structure including a plurality of thin film transistors; forming a first pixel electrode on the film structure; coating a first insulating layer on the first substrate on which the first pixel electrode is formed; defining a first contact hole and a second contact hole in the film structure and the first insulating layer, the first contact hole exposing a portion of a first thin film transistor of the thin film transistors and the second contact hole exposing a portion of a second thin film transistor of the thin film transistors; and forming a bridge electrode connecting the first thin film transistor and the first pixel electrode through the first contact hole; and forming a second pixel electrode connected to the second thin film transistor through the second contact hole. The first pixel electrode is formed in a different pixel area from a pixel area in which the second pixel electrode is formed.

The forming of the bridge electrode and the forming of the second pixel electrode may be substantially simultaneously performed.

According to an exemplary embodiment, a display device includes: a first substrate and a second substrate including a plurality of pixel areas and opposing each other; a liquid crystal layer between the first substrate and the second substrate; and a first pixel electrode and a second pixel electrode on the first substrate. The first pixel electrode includes a different material from a material forming the second pixel electrode.

The first pixel electrode and the second pixel electrode may be disposed on substantially a same layer.

The first pixel electrode may have a different etching ratio from an etching ratio of the second pixel electrode.

The first pixel electrode may include one selected from the group consisting of: indium tin oxide (ITO), indium zinc oxide (IZO), indium tin zinc oxide (ITZO), aluminum zinc oxide (AZO), and amorphous indium tin oxide (a-ITO).

The display device may further include: a gate line extending in a first direction and a data line extending in a second direction which intersects the first direction. A distance between the first pixel electrode and the second pixel electrode may be less than a width of the data line in the first direction.

At least a portion of the first pixel electrode and at least a portion of the second pixel electrode may overlap the data line.

A distance between the first pixel electrode and the second pixel electrode may be in a range of about 0.3 µm to about 1.0 µm.

According to an exemplary embodiment, a method of manufacturing a display device includes: preparing a first substrate including a plurality of pixel areas; forming a film structure on the first substrate, the film structure including a plurality of thin film transistors; coating a first pixel electrode-forming material on the film structure; patterning the first pixel electrode-forming material using a first mask to form a first pixel electrode; coating a second pixel electrode-forming material on the first substrate on which the first pixel electrode is formed; and patterning the second pixel electrode-forming material using a second mask to form a second pixel electrode. The first pixel electrode-forming material includes a different material from a material forming the second pixel electrode-forming material.

The first pixel electrode and the second pixel electrode may be formed on substantially a same layer.

The first pixel electrode may have a different etching ratio from an etching ratio of the second pixel electrode.

The first pixel electrode may include one selected from the group consisting of: indium tin oxide (ITO), indium zinc oxide (IZO), indium tin zinc oxide (ITZO), aluminum zinc oxide (AZO), and amorphous indium tin oxide (a-ITO).

A distance between the first pixel electrode and the second pixel electrode may be in a range of about 0.3 µm to about 1.0 µm.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which.

DETAILED DESCRIPTION

Figure 1:
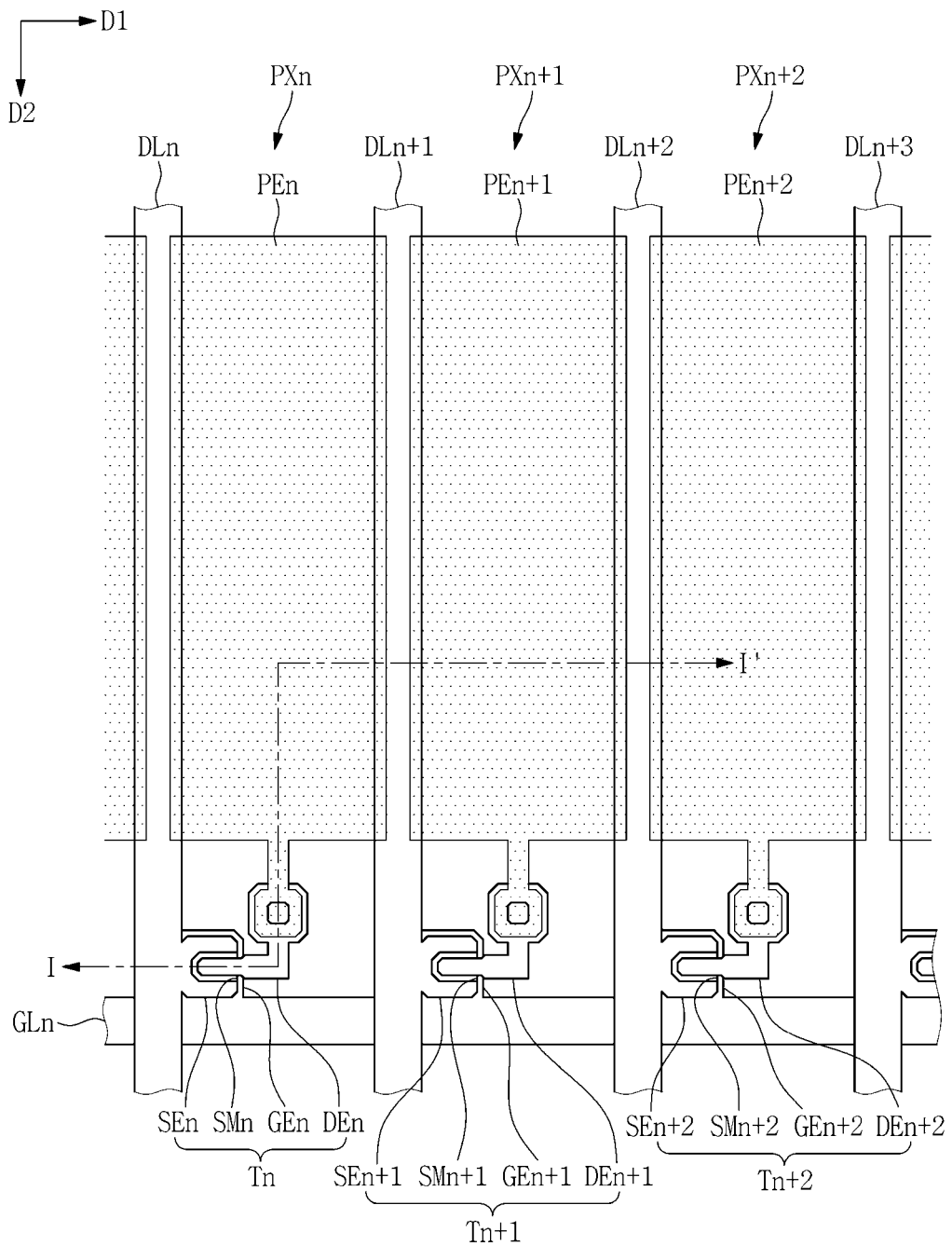
FIG. 1 is a schematic plan view illustrating an exemplary embodiment of a display device.

Features of the inventive concept and methods for achieving them will be made clear from exemplary embodiments described below in detail with reference to the accompanying drawings. The inventive concept may, however, be embodied in many different forms and should not be construed as being limited to the exemplary embodiments set forth herein. Rather, these exemplary embodiments are provided so that this disclosure will be thorough and complete, and will fully convey the scope of the inventive concept to those skilled in the art. The inventive concept is merely defined by the scope of the claims. Therefore, well-known constituent elements, operations and techniques are not described in detail in the exemplary embodiments in order to prevent the inventive concept from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further, when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this application pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments, and like reference numerals refer to like elements throughout the specification.

Figure 2:
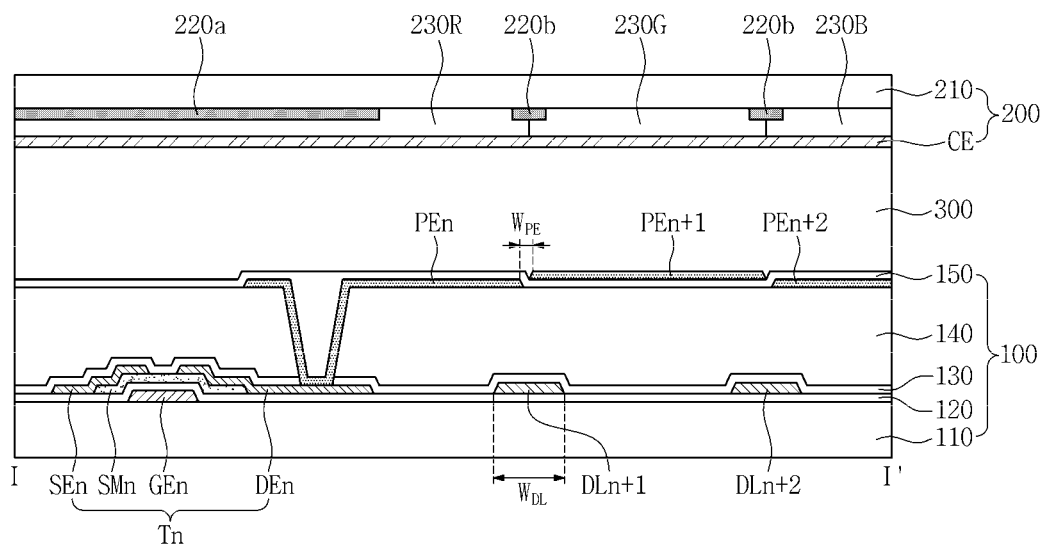
FIG. 2 is a cross-sectional view taken along line I-I' of FIG. 1.

FIG. 1 is a schematic plan view illustrating an exemplary embodiment of a display device, and FIG. 2 is a cross-sectional view taken along line I-I' of FIG. 1. FIG. 1 illustrates three pixels $PX_n$, $PX_{n+1}$, and $PX_{n+2}$ that are arranged in a row along a first direction D1, for ease of description.

Referring to FIGS. 1 and 2, an exemplary embodiment of a display device includes a plurality of pixels $PX_n$, $PX_{n+1}$, and $PX_{n+2}$. An exemplary embodiment of a display device includes a display substrate 100, an opposing substrate 200, and a liquid crystal layer 300 between the display substrate 100 and the opposing substrate 200.

In addition, an exemplary embodiment of a display device may further include a backlight unit (not illustrated) which provides light toward the display substrate 100. However, the scope of the embodiments is not limited to a liquid crystal display (LCD) device, and an exemplary embodiment may be applied to an organic light emitting diode (OLED) device, for example.

The display substrate 100 may include a first substrate 110, a gate wiring $GL_n$, $GE_n$, $GE_{n+1}$, and $GE_{n+2}$, a gate insulating layer 120, semiconductor layers $SM_n$, $SM_{n+1}$, and $SM_{n+2}$, a data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, an insulating interlayer 130, a passivation layer 140, first, second, and third pixel electrodes $PE_n$, $PE_{n+1}$, and $PE_{n+2}$, first, second, and third thin film transistors (TFTs) $T_n$, $T_{n+1}$, and $T_{n+2}$, or the like. Gate wiring $GE_n$, $GE_{n+1}$, and $GE_{n+2}$ are sometimes called gate electrodes $GE_n$, $GE_{n+1}$, and $GE_{n+2}$, respectively. Data wiring $SE_n$, $SE_{n+1}$, $SE_{n+2}$, $DE_n$, $DE_{n+1}$, and $DE_{n+2}$ are sometimes called source electrodes $SE_n$, $SE_{n+1}$, $SE_{n+2}$ and drain electrodes $DE_n$, $DE_{n+1}$, and $DE_{n+2}$, respectively.

The first thin film transistor (TFT) $T_n$ may include the first gate electrode $GE_n$, the first semiconductor layer $SM_n$, the first source electrode $SE_n$, and the first drain electrode $DE_n$. The second TFT $T_{n+1}$ may include the second gate electrode $GE_{n+1}$, the second semiconductor layer $SM_{n+1}$, the second source electrode $SE_{n+1}$, and the second drain electrode $DE_{n+1}$. The third TFT $T_{n+2}$ may include the third gate electrode $GE_{n+2}$, the third semiconductor layer $SM_{n+2}$, the third source electrode $SE_{n+2}$, and the third drain electrode $DE_{n+2}$.

The first substrate 110 may be an insulating substrate, e.g., a plastic substrate, which has light transmitting characteristics and flexibility. However, exemplary embodiments are not limited thereto, and the first substrate 110 may include a hard substrate such as a glass substrate.

The gate wiring $GL_n$, $GE_n$, $GE_{n+1}$, and $GE_{n+2}$ is disposed on the first substrate 110.

The gate wiring $GL_n$, $GE_n$, $GE_{n+1}$, and $GE_{n+2}$ includes the gate line $GL_n$ extending in the first direction D1 and the first, second, and third gate electrodes $GE_n$, $GE_{n+1}$, and $GE_{n+2}$ branching off from the gate line $GL_n$.

The gate wiring $GL_n$, $GE_n$, $GE_{n+1}$, and $GE_{n+2}$ may include or be formed of aluminum (Al) or alloys thereof, silver (Ag) or alloys thereof, copper (Cu) or alloys thereof, molybdenum (Mo) or alloys thereof, chromium (Cr), tantalum (Ta), titanium (Ti), and/or the like.

In addition, the gate wiring $GL_n$, $GE_n$, $GE_{n+1}$, and $GE_{n+2}$ may have a multilayer structure including two or more conductive layers (not illustrated) having different physical properties. For example, a conductive layer of the multilayer structure may include or be formed of metal, e.g., an aluminum (Al)-based metal, a silver (Ag)-based metal, and a copper (Cu)-based metal, which has low resistivity to reduce signal delay or voltage drop, and another conductive layer of the multilayer structure may include a material, e.g., a molybdenum-based metal, chromium, titanium, and tantalum, which is found to impart excellent contact properties with indium tin oxide (ITO) and indium zinc oxide (IZO).

Examples of the multilayer structure may include a chromium lower layer and an aluminum upper layer, an aluminum lower layer and a molybdenum upper layer, a titanium lower layer and a copper upper layer. However, exemplary embodiments are not limited thereto, and the gate wiring $GL_n$, $GE_n$, $GE_{n+1}$, and $GE_{n+2}$ may include various kinds of metals and conductors. The gate wiring $GL_n$, $GE_n$, $GE_{n+1}$, and $GE_{n+2}$ may be simultaneously provided in substantially a same process.

The gate insulating layer 120 is disposed on the first substrate 110 on which the gate wiring $GL_n$, $GE_n$, $GE_{n+1}$, and $GE_{n+2}$ is disposed. The gate insulating layer 120 may include silicon oxide ($SiO_x$), silicon nitride ($SiN_x$), or the like. In addition, the gate insulating layer 120 may further include aluminum oxide, titanium oxide, tantalum oxide, or zirconium oxide.

The semiconductor layers $SM_n$, $SM_{n+1}$, and $SM_{n+2}$ are disposed on the gate insulating layer 120. The semiconductor layers $SM_n$, $SM_{n+1}$, and $SM_{n+2}$ may include or be formed of amorphous silicon or an oxide semiconductor including at least one (or any combination) selected from the group consisting of: gallium (Ga), indium (In), tin (Sn), and zinc (Zn). Although not illustrated, an ohmic contact layer may be disposed on the semiconductor layers $SM_n$, $SM_{n+1}$, and $SM_{n+2}$.

In FIG. 2, each of the semiconductor layers $SM_n$, $SM_{n+1}$, and $SM_{n+2}$ is depicted as substantially overlapping the first, second, and third gate electrodes $GE_n$, $GE_{n+1}$, and $GE_{n+2}$. However, exemplary embodiments are not limited thereto, and the semiconductor layers $SM_n$, $SM_{n+1}$, and $SM_{n+2}$ may substantially overlap the data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ to be described hereinbelow.

The data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ is disposed on the first substrate 110 on which the semiconductor layers $SM_n$, $SM_{n+1}$, and $SM_{n+2}$ are disposed.

The data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ includes: data lines $DL_n$, $DL_{n+1}$, $DL_{n+2}$, and $DL_{n+3}$ extending in a second direction D2 which intersects the first direction D1; the first, second, and third source electrodes $SE_n$, $SE_{n+1}$, and $SE_{n+2}$ branching off from the data lines $DL_n$, $DL_{n+1}$, and $DL_{n+2}$ to overlap the semiconductor layers $SM_n$, $SM_{n+1}$, and $SM_{n+2}$; and the first, second, and third drain electrodes $DE_n$, $DE_{n+1}$, $DE_{n+2}$ spaced apart from the first, second, and third source electrodes $SE_n$, $SE_{n+1}$, and $SE_{n+2}$ to overlap the semiconductor layers $SM_n$, $SM_{n+1}$, and $SM_{n+2}$. The data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ may include substantially a same material as that included in the gate wiring $GL_n$, $GE_n$, $GE_{n+1}$, $GE_{n+2}$. The data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ may be simultaneously provided in substantially a same process.

The insulating interlayer 130 is disposed on the first substrate 110 on which the data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$ is disposed. The insulating interlayer 130 may have a monolayer structure or a multilayer structure including, for example, silicon oxide, silicon nitride, a photosensitive organic material, or a low dielectric constant insulating material such as a-Si:C:O or a-Si:O:F.

The passivation layer 140 is disposed on the insulating interlayer 130. The passivation layer 140 may have a monolayer structure or a multilayer structure including, for example, silicon oxide, silicon nitride, a photosensitive organic material, or a silicon-based low dielectric constant insulating material.

However, exemplary embodiments are not limited thereto, and in the case of a color filter on array (COA) structure in which a color filter is disposed on the first substrate 110, a color filter may be provided in lieu of the passivation layer 140, or a color filter may be disposed between the insulating interlayer 130 and the passivation layer 140.

The first, second, and third pixel electrodes $PE_n$, $PE_{n+1}$, and $PE_{n+2}$ are disposed in different pixel areas, respectively, on the passivation layer 140. The first, second, and third pixel electrodes $PE_n$, $PE_{n+1}$, and $PE_{n+2}$ are disposed adjacent to one another with respect to respective ones of the data lines $DL_n$, $DL_{n+1}$ and $DL_{n+2}$. In an exemplary embodiment, the first, second, and third pixel electrodes $PE_n$, $PE_{n+1}$, and $PE_{n+2}$ may have substantially a same shape, but exemplary embodiments are not limited thereto. In an alternative exemplary embodiment, the first, second, and third pixel electrodes $PE_n$, $PE_{n+1}$, and $PE_{n+2}$ may have different shapes from one another.

Each of the first, second, and third pixel electrodes $PE_n$, $PE_{n+1}$, and $PE_{n+2}$ may have a length in the first direction D1 in a range of about 3.0 μm to about 5.0 μm, and may have a length in the second direction D2 in a range of about 10.0 μm to about 12.0 μm.

For example, the first pixel electrode $PE_n$ and the third pixel electrode $PE_{n+2}$ may be disposed in an odd-numbered column, and the second pixel electrode $PE_{n+1}$ may be disposed in an even-numbered column; however, exemplary embodiments are not limited thereto.

Each of the first pixel electrode $PE_n$ and the third pixel electrode $PE_{n+2}$ may pass through the insulating interlayer 130 and the passivation layer 140 to be connected to the first drain electrode $DE_n$ and the third drain electrode $DE_{n+2}$.

A first insulating layer 150 may be disposed over an entire surface of the first substrate 110 on which the first pixel electrode $PE_n$ and the third pixel electrode $PE_{n+2}$ are formed. The first insulating layer 150 may include silicon oxide ($SiO_x$) or silicon nitride ($SiN_x$).

The second pixel electrode $PE_{n+1}$ is disposed on the first insulating layer 150. The second pixel electrode $PE_{n+1}$ passes through the insulating interlayer 130, the passivation layer 140, and the first insulating layer 150 to be connected to the second drain electrode $DE_{n+1}$.

The first pixel electrode $PE_n$ and the second pixel electrode $PE_{n+1}$, adjacently disposed with respect to the data line $DL_{n+1}$, are disposed in different layers, respectively, due to the first insulating layer 150 such that the first pixel electrode $PE_n$ and the second pixel electrode $PE_{n+1}$ may have a significantly small distance from each other regardless of a resolution limit of an exposure.

For example, a distance $W_{PE}$ from a plane between the first pixel electrode $PE_n$ and the second pixel electrode $PE_{n+1}$ may be in a range of about 0.3 μm to about 1.0 μM.

In general, the data lines $DL_n$, $DL_{n+1}$, $DL_{n+2}$, and $DL_{n+3}$ have a width $W_{DL}$ in a range of about 0.8 μm to about 1.2 μm, and thus the distance $W_{PE}$ between the first pixel electrode $PE_n$ and the second pixel electrode $PE_{n+1}$ is less than the width $W_{DL}$ of the data lines $DL_n$, $DL_{n+2}$, and $DL_{n+3}$.

Accordingly, at least a portion of the first pixel electrode $PE_n$ and at least a portion of the second pixel electrode $PE_{n+1}$ overlap the data line $DL_{n+1}$ from a plane, and at least a portion of the second pixel electrode $PE_{n+1}$ and at least a portion of the third pixel electrode $PE_{n+2}$ may overlap the data line $DL_{n+2}$ from a plane.

The first, second, and third pixel electrodes $PE_n$, $PE_{n+1}$, and $PE_{n+2}$ may include or be formed of a transparent conductive material. For example, the first, second, and third pixel electrodes $PE_n$, $PE_{n+1}$, and $PE_{n+2}$ may include at least one (or any combination) selected from the group consisting of: indium tin oxide (ITO), indium zinc oxide (IZO), indium tin zinc oxide (ITZO), aluminum zinc oxide (AZO), and amorphous indium tin oxide (a-ITO).

A lower alignment layer (not illustrated) may be disposed on the first, second, and third pixel electrodes $PE_n$, $PE_{n+1}$, and $PE_{n+2}$. The lower alignment layer may be a homeotropic alignment layer or a photoalignment layer including a photopolymerizable material.

The opposing substrate 200 may include a second substrate 210, black matrixes 220a and 220b, color filters 230R, 230G, and 230B, a common electrode CE, or the like.

The second substrate 210 may be an insulating substrate, e.g., a plastic substrate, having light transmitting characteristics and flexibility. However, exemplary embodiments are not limited thereto, and the second substrate 210 may include a hard substrate such as a glass substrate.

The black matrixes 220a and 220b may be disposed on the second substrate 210.

The black matrixes 220a and 220b may include the first black matrix 220a extending in the first direction D1 along the gate line $GL_n$ and the second black matrix 220b extending in the second direction D2 along the data lines $DL_n$, $DL_{n+1}$, $DL_{n+2}$, and $DL_{n+3}$. The second black matrix 220b may have a smaller width than a width of the data lines $DL_n$, $DL_{n+1}$, $DL_{n+2}$, $DL_{n+3}$, and may be omitted.

In addition, in the case of a black matrix on array (BOA) structure in which a light blocking member is disposed on the first substrate 110, the black matrixes 220a and 220b may be disposed on the first substrate 110.

The black matrixes 220a and 220b may include or be formed of a photosensitive composition. Examples of the photosensitive composition may include: a binder resin, a polymerizable monomer, a polymerizable oligomer, a pigment, a dispersant, and a photoinitiator. The pigment may use a black pigment, a black resin, or the like.

The color filters 230R, 230G, and 230B are disposed on the black matrixes 220a and 220b.

The color filters 230R, 230G, and 230B may be one selected from: a red color filter, a green color filter, a blue color filter, a cyan color filter, a magenta color filter, a yellow color filter, and a white color filter. Three primary colors of red, green, and blue or cyan, magenta, and yellow may define a basic pixel group for forming a color.

The common electrode CE is disposed on the second substrate 210 on which the color filters 230R, 230G, and 230B are disposed. However, exemplary embodiments are not limited thereto, and the common electrode CE may be disposed on the first substrate 110 (refer to FIG. 3).

The common electrode CE may be a whole planar electrode including a transparent conductor such as indium tin oxide (ITO) or indium zinc oxide (IZO). In an alternative exemplary embodiment, the common electrode CE may have an uneven portion or at least one slit to define a plurality of domains.

An upper alignment layer (not illustrated) may be disposed on the common electrode CE. The upper alignment layer (not illustrated) may be a homeotropic alignment layer or a photoalignment layer including a photopolymerizable material.

Figure 3:
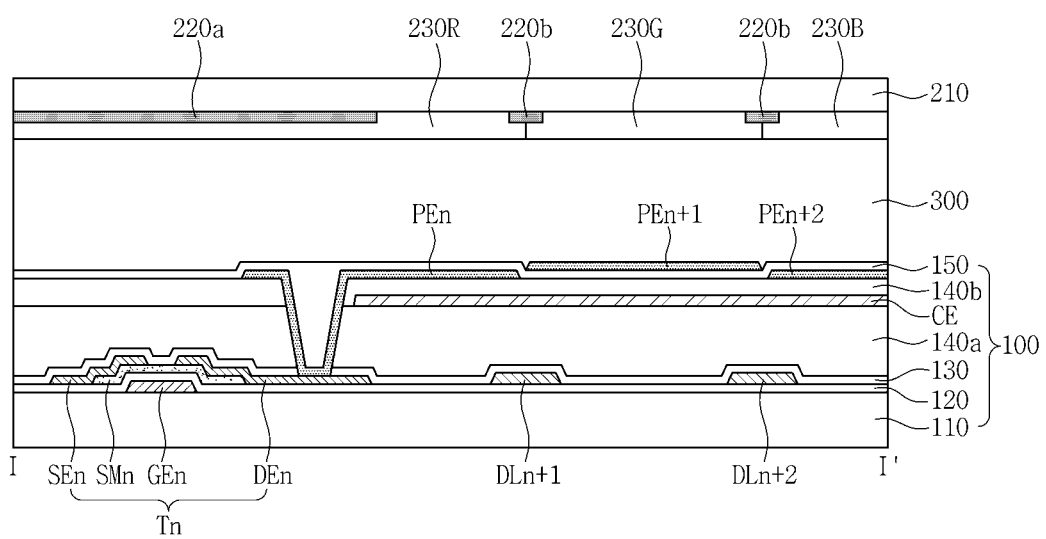
FIGS. 3 and 4 are cross-sectional views illustrating alternative exemplary embodiments of a display device.

FIG. 3 is a cross-sectional view illustrating an alternative exemplary embodiment of a display device. Descriptions with regard to configurations of an exemplary embodiment of a display device will not be repeated and thus be omitted in descriptions with regard to configurations of an alternative exemplary embodiment of a display device.

Referring to FIGS. 1 and 3, a gate wiring $GL_n$, $GE_n$, $GE_{n+1}$, and $GE_{n+2}$, a gate insulating layer 120, semiconductor layers $SM_n$, $SM_{n+1}$, and $SM_{n+2}$, a data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, and an insulating interlayer 130 are sequentially disposed on a first substrate 110. A first passivation layer 140a, a common electrode CE, and a second passivation layer 140b are sequentially disposed on the insulating interlayer 130.

The first passivation layer 140a and the second passivation layer 140b may have a monolayer structure or a multilayer structure including, for example, silicon oxide, silicon nitride, a photosensitive organic material, a silicon-based low dielectric constant insulating material, or the like.

The common electrode CE and the first, second, and third pixel electrodes $PE_n$, $PE_{n+1}$, $PE_{n+2}$ form a fringe field, having the second passivation layer 140b thereamong, thereby adjusting an alignment direction of a liquid crystal layer 300. The common electrode CE may be disposed over an entire surface of the first substrate 110 except an area in which TFTs $T_n$, $T_{n+1}$, and $T_{n+2}$ are formed.

The first and third pixel electrodes $PE_n$ and $PE_{n+2}$, the first insulating layer 150, and the second pixel electrode $PE_{n+1}$ are sequentially disposed on the second passivation layer 140b. A lower alignment layer (not illustrated) may be disposed on the first, second, and third pixel electrodes $PE_n$, $PE_{n+1}$, $PE_{n+2}$. The lower alignment layer may be a homeotropic alignment layer.

An opposing substrate 200 may include a second substrate 210, black matrixes 220a and 220b, and color filters 230R, 230G, and 230B, for example. The black matrixes 220a and 220b and the color filters 230R, 230G, and 230B are sequentially disposed on the second substrate 210, and an upper alignment layer (not illustrated) may be disposed on the color filters 230R, 230G, and 230B. The upper alignment layer may be a homeotropic alignment layer.

Figure 4:
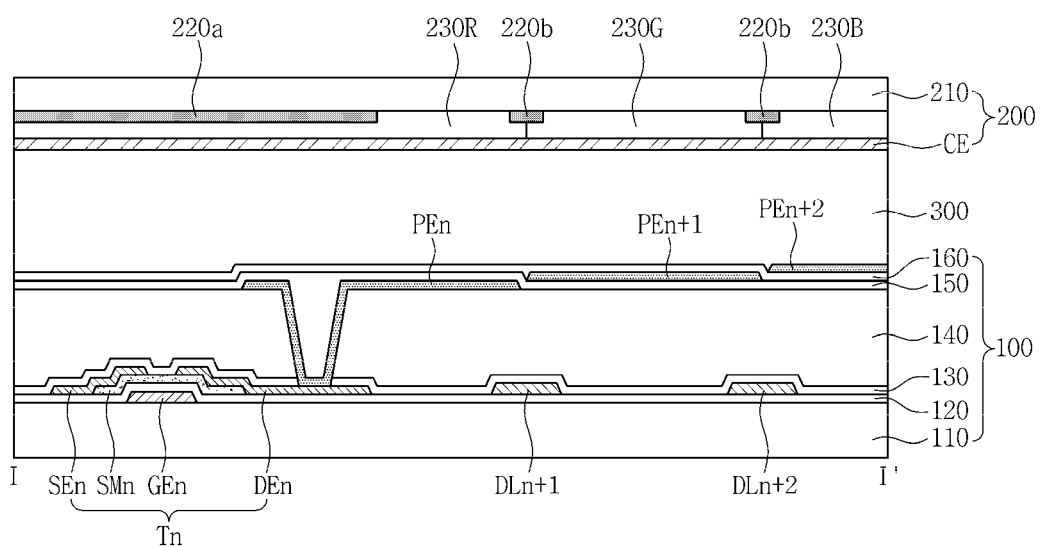

FIG. 4 is a cross-sectional view illustrating another alternative exemplary embodiment of a display device. Descriptions with regard to configurations of an exemplary embodiment of a display device will not be repeated and thus be omitted in descriptions with regard to configurations of another alternative exemplary embodiment of a display device.

Referring to FIGS. 1 and 4, a gate wiring $GL_n$, $GE_n$, $GE_{n+1}$, and $GE_{n+2}$, a gate insulating layer 120, semiconductor layers $SM_n$, $SM_{n+1}$, and $SM_{n+2}$, a data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, an insulating interlayer 130, and a passivation layer 140 are sequentially disposed on a first substrate 110.

First, second, and third pixel electrodes $PE_n$, $PE_{n+1}$, and $PE_{n+2}$ are disposed in different pixel areas, respectively, on the passivation layer 140. The first, second, and third pixel electrodes $PE_n$, $PE_{n+1}$, and $PE_{n+2}$ may be disposed adjacent to one another with respect to respective ones of data lines $DL_{n+1}$ and $DL_{n+2}$.

For example, the first pixel electrode $PE_n$ may be disposed in a first column, the second pixel electrode $PE_{n+1}$ may be disposed in a second column, and the third pixel electrode $PE_{n+2}$ may be disposed in a third column; however, exemplary embodiments are not limited thereto.

The first pixel electrode $PE_n$ may pass through the insulating interlayer 130 and the passivation layer 140 to be connected to a first drain electrode $DE_n$, and a first insulating layer 150 may be disposed over an entire surface of the first substrate 110 on which the first pixel electrode $PE_n$ is formed.

In addition, the second pixel electrode $PE_{n+1}$ may pass through the insulating interlayer 130, the passivation layer 140, and the first insulating layer 150 to be connected to a second drain electrode $DE_{n+1}$, and a second insulating layer 160 may be disposed over the entire surface of the first substrate 110 on which the second pixel electrode $PE_{n+1}$ is formed.

In addition, the third pixel electrode $PE_{n+2}$ may pass through the insulating interlayer 130, the passivation layer 140, the first insulating layer 150, and the second insulating layer 160 to be connected to a third drain electrode $DE_{n+2}$.

The first insulating layer 150 and the second insulating layer 160 may include silicon oxide (SiOx) or silicon nitride (SiNx).

An opposing substrate 220 may include a second substrate 210, black matrixes 220a and 220b, color filters 230R, 230G, and 230B, and a common electrode CE, for example.

FIGS. 5, 6A, 6B, 6C, 6D, 6E, and 6F are views illustrating an exemplary embodiment of a method of manufacturing a display device. FIGS. 6A, 6B, 6C, 6D, 6E, and 6F are cross-sectional views taken along line II-IP of FIG. 5.

Figure 5:
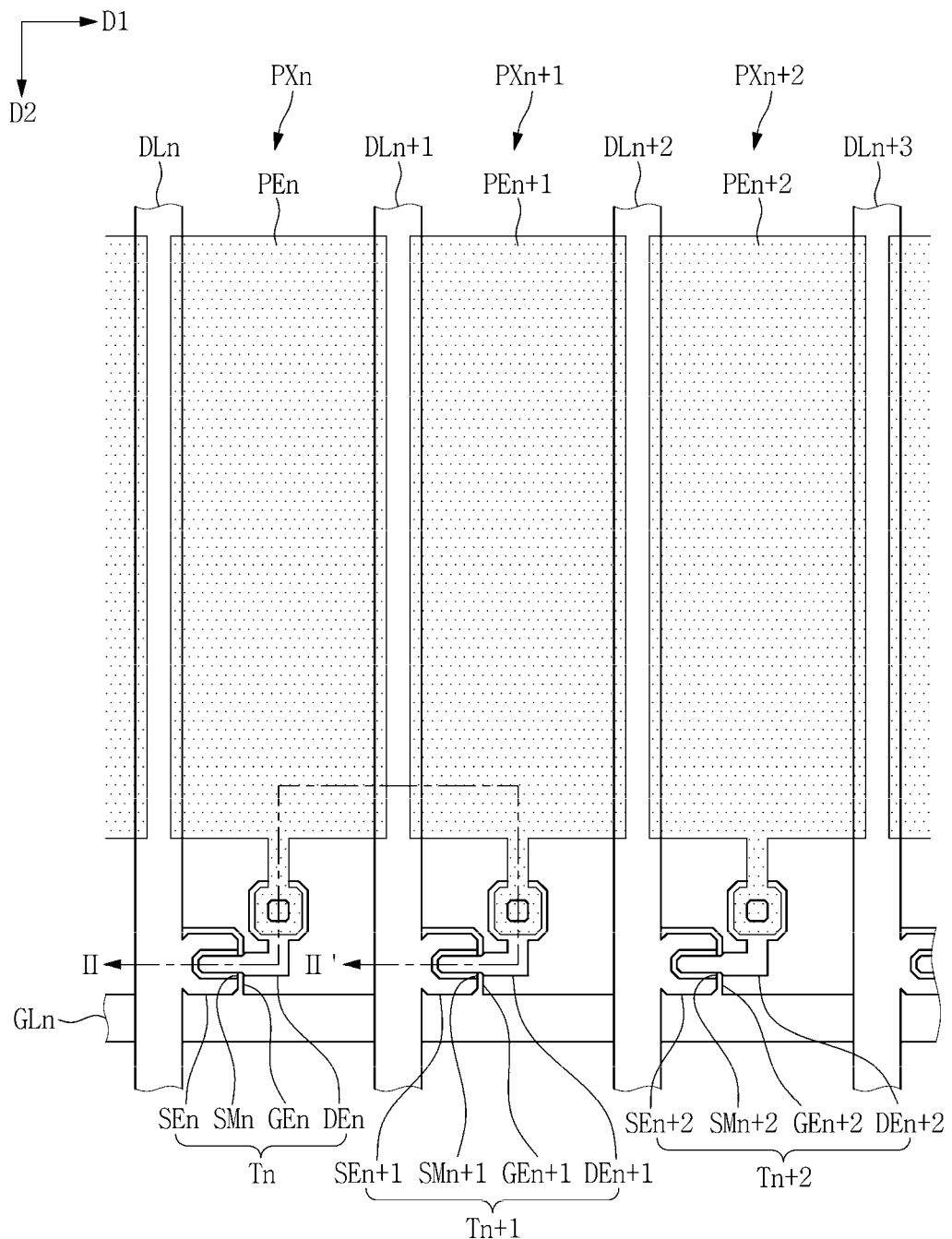
FIGS. 5, 6A, 6B, 6C, 6D, 6E, and 6F are views illustrating an exemplary embodiment of a method of manufacturing a display device.
Figure 6A:
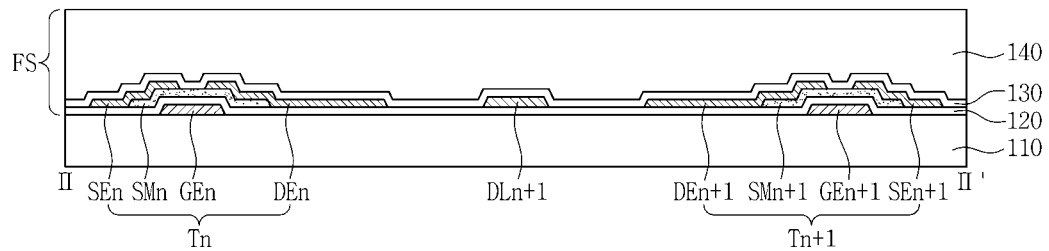

Referring to FIGS. 5 and 6A, a film structure FS including a plurality of TFTs $T_n$ and $T_{n+1}$ is formed on a first substrate 110 which includes transparent glass or plastic.

For example, a gate wiring including first and second gate electrodes $GE_n$ and $GE_{n+1}$ is formed on the first substrate 110. A gate insulating layer 120 is disposed over an entire surface of the first substrate 110 on which the gate wiring is formed.

Semiconductor layers $SM_n$ and $SM_{n+1}$ overlapping at least a portion of the first and second gate electrodes $GE_n$ and $GE_{n+1}$ are formed on the gate insulating layer 120. Subsequently, a data wiring including a data line $DL_{n+1}$, first and second source electrodes $SE_n$ and $SE_{n+1}$, and first and second drain electrodes $DE_n$ and $DE_{n+1}$ is formed on the first substrate 110 on which the semiconductor layers $SM_n$ and $SM_{n+1}$ are formed.

An insulating interlayer 130 is formed over the entire surface of the first substrate 110 on which the data wiring $SE_n$, $SE_{n+1}$, $DE_n$, and $DE_{n+1}$ is formed, and subsequently, a passivation layer 140 is formed on the insulating interlayer 130.

Figure 6B:
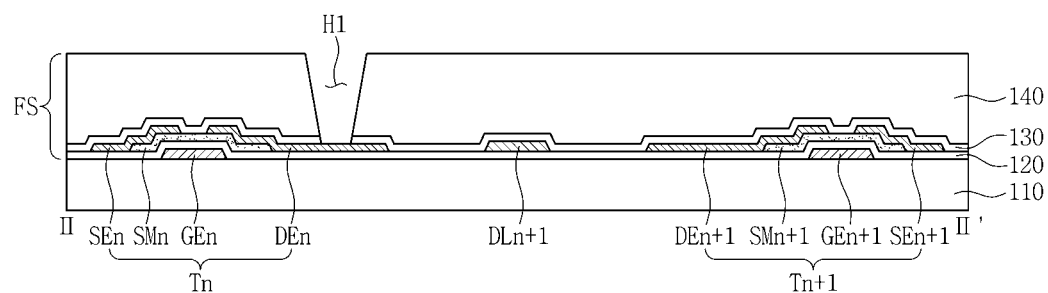

Referring to FIGS. 5 and 6B, a first contact hole H1 which passes through the insulating interlayer 130 and the passivation layer 140 to extend to and expose a portion of the first drain electrode $DE_n$ is defined. The first contact hole H1 may be defined in a pixel area to be formed with a first pixel electrode $PE_n$ to be described hereinbelow.

Figure 6C:
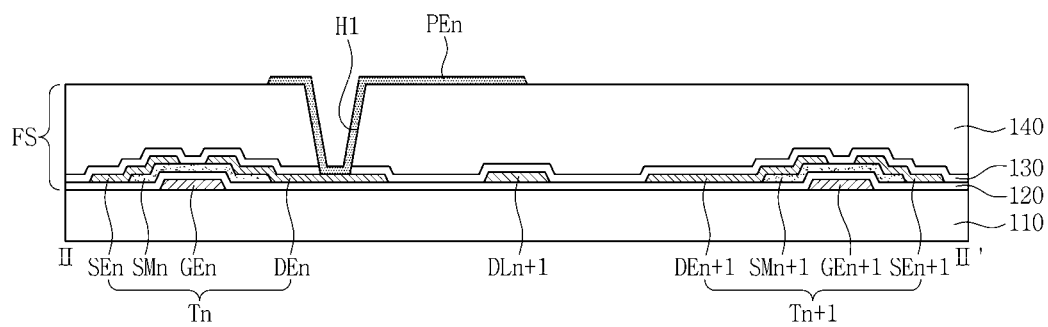

Referring to FIGS. 5 and 6C, the first pixel electrode $PE_n$ connected to the first drain electrode $DE_n$ through the first contact hole H1 is formed. At least a portion of the first pixel electrode $PE_n$ may be formed to overlap the data line $DL_{n+1}$.

Figure 6D:
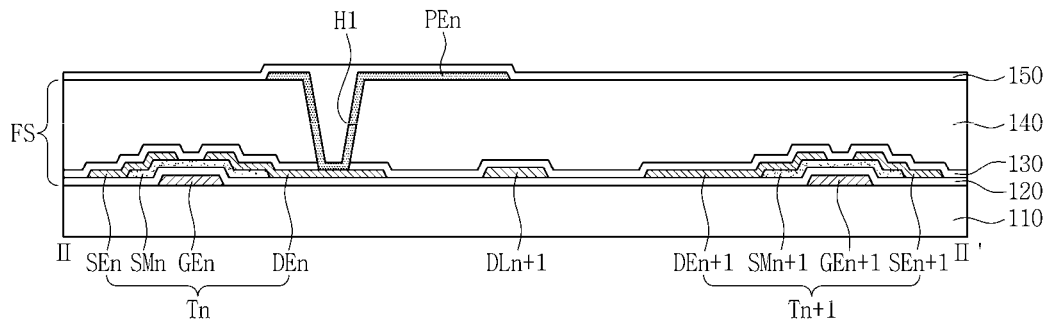

Referring to FIGS. 5 and 6D, a first insulating layer 150 is formed over the entire surface of the first substrate 110 on which the first pixel electrode $PE_n$ is formed.

Figure 6E:
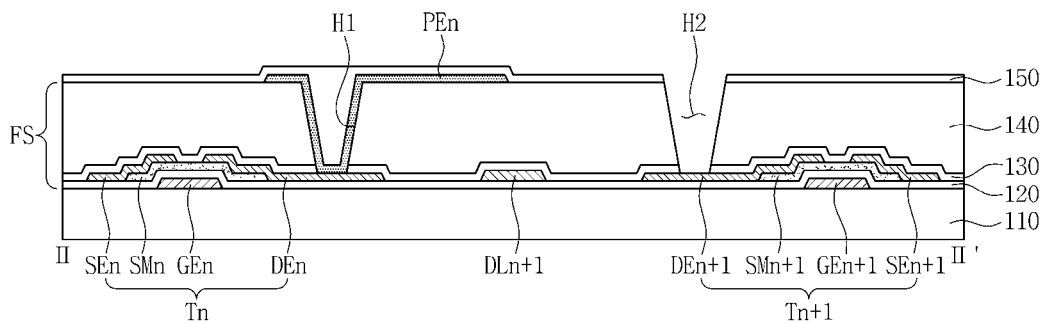

Referring to FIGS. 5 and 6E, a second contact hole H2 which passes through the insulating interlayer 130, the passivation layer 140, and the first insulating layer 150 to extend to and expose a portion of the second drain electrode $DE_{n+1}$ is defined. The second contact hole H2 may be defined in a pixel area to be formed with a second pixel electrode $PE_{n+1}$ to be described hereinbelow.

Figure 6F:
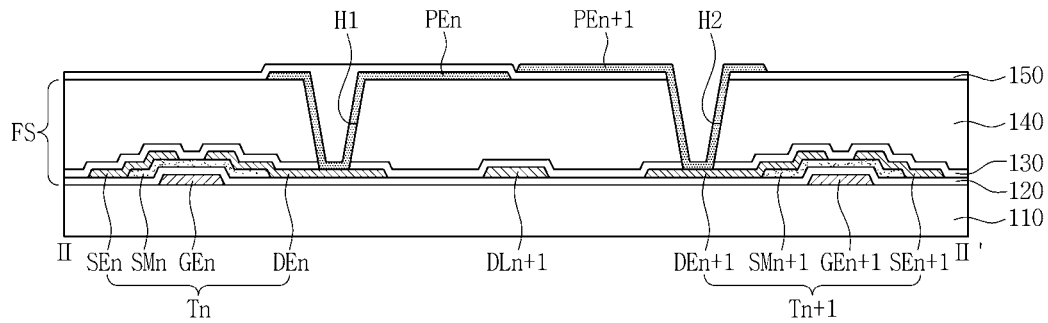

Referring to FIGS. 5 and 6F, the second pixel electrode $PE_{n+1}$ connected to the second drain electrode $DE_{n+1}$ through the second contact hole H2 is formed. At least a portion of the second pixel electrode $PE_{n+1}$ may be formed to overlap the data line $DL_{n+1}$. The first pixel electrode $PE_n$ and the second pixel electrode $PE_{n+1}$ may be formed respectively in different pixel areas adjacent to one another.

FIGS. 7A, 7B, 7C, 7D, and 7E are views illustrating an alternative exemplary embodiment of a method of manufacturing a display device. Descriptions with regard to configurations of an exemplary embodiment of a display device will not be repeated and thus be omitted in descriptions with regard to configurations of an alternative exemplary embodiment of a display device.

Figure 7A:
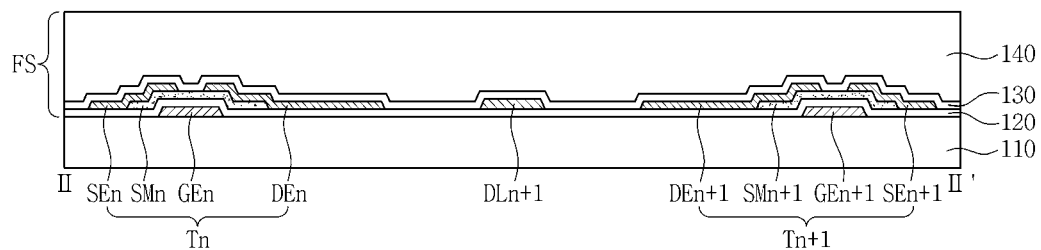
FIGS. 7A, 7B, 7C, 7D, and 7E are views illustrating an alternative exemplary embodiment of a method of manufacturing a display device.

Referring to FIG. 7A, a film structure FS including a plurality of TFTs $T_n$ and $T_{n+1}$ is formed on a first substrate 110.

Figure 7B:
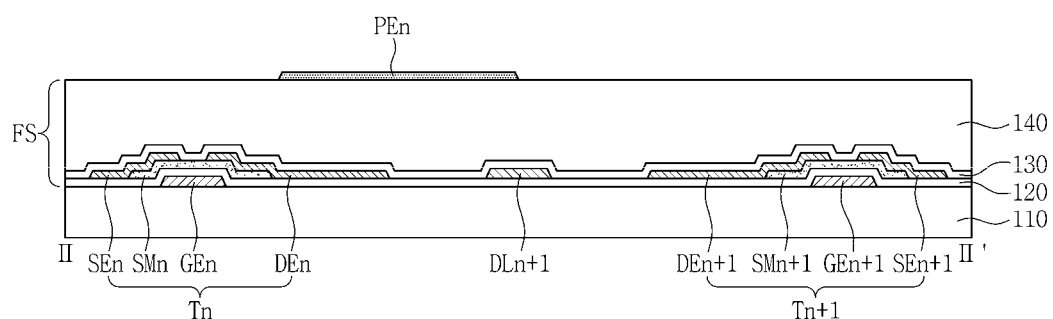

Referring to FIG. 7B, a first pixel electrode $PE_n$ is formed on a passivation layer 140. At least a portion of the first pixel electrode $PE_n$ may be formed to overlap a data line $DL_{n+1}$.

Figure 7C:
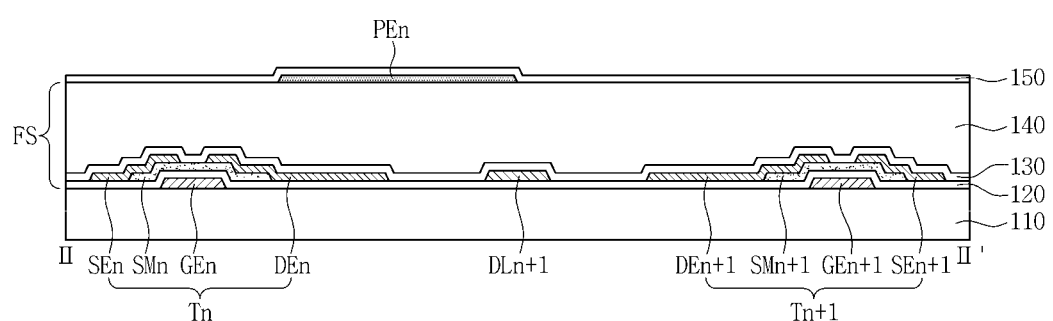

Referring to FIG. 7C, a first insulating layer 150 is formed over an entire surface of the first substrate 110 on which the first pixel electrode $PE_n$ is formed.

Figure 7D:
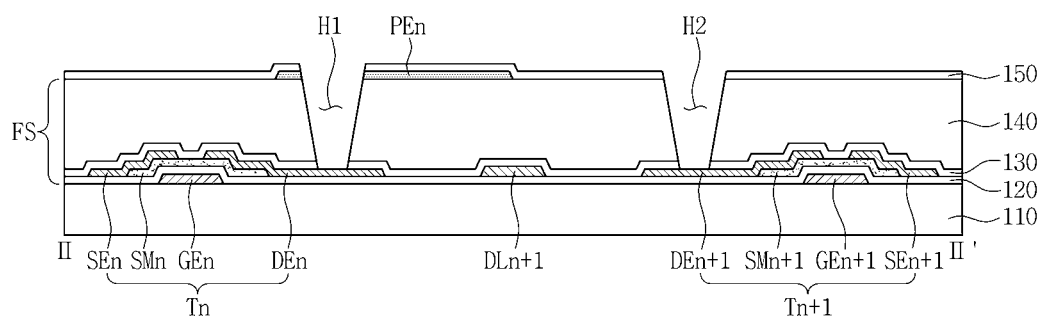

Referring to FIG. 7D, a first contact hole H1 which passes through an insulating interlayer 130, the passivation layer 140, the first pixel electrode $PE_n$, and the first insulating layer 150 to extend to and expose a portion of a first drain electrode $DE_n$ and a second contact hole H2 which passes through the insulating interlayer 130, the passivation layer 140, and the first insulating layer 150 to extend to and expose a portion of a second drain electrode $DE_{n+1}$ are defined.

The first contact hole H1 may be defined in a pixel area to be formed with the first pixel electrode $PE_n$ and the second contact hole H2 may be defined in a pixel area to be formed with a second pixel electrode $PE_{n+1}$.

Figure 7E:
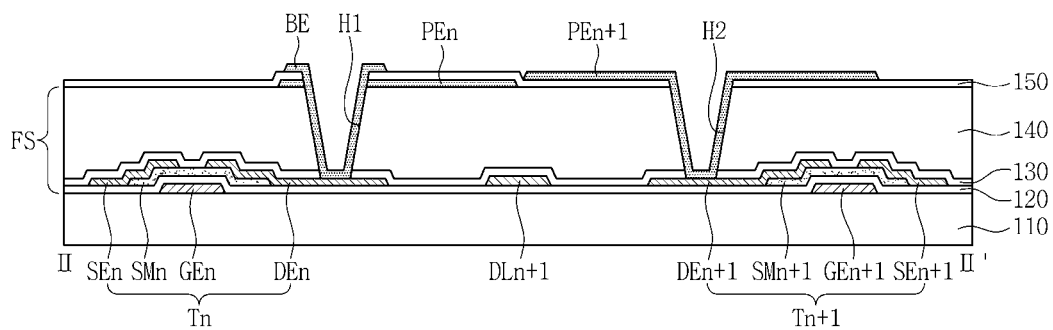

Referring to FIG. 7E, a bridge electrode BE connecting the first drain electrode $DE_n$ and the first pixel electrode $PE_n$ through the first contact hole H1 is formed. The second pixel electrode $PE_{n+1}$ connected to the second drain electrode $DE_{n+1}$ through the second contact hole H2 is formed. At least a portion of the second pixel electrode $PE_{n+1}$ may be formed to overlap the data line $DL_{n+1}$. The first pixel electrode $PE_n$ and the second pixel electrode $PE_{n+1}$ may be respectively formed in different pixel areas adjacent to one another.

The bridge electrode BE and the second pixel electrode $PE_{n+1}$ may include substantially a same material and may be simultaneously provided in substantially a same process.

Figure 8:
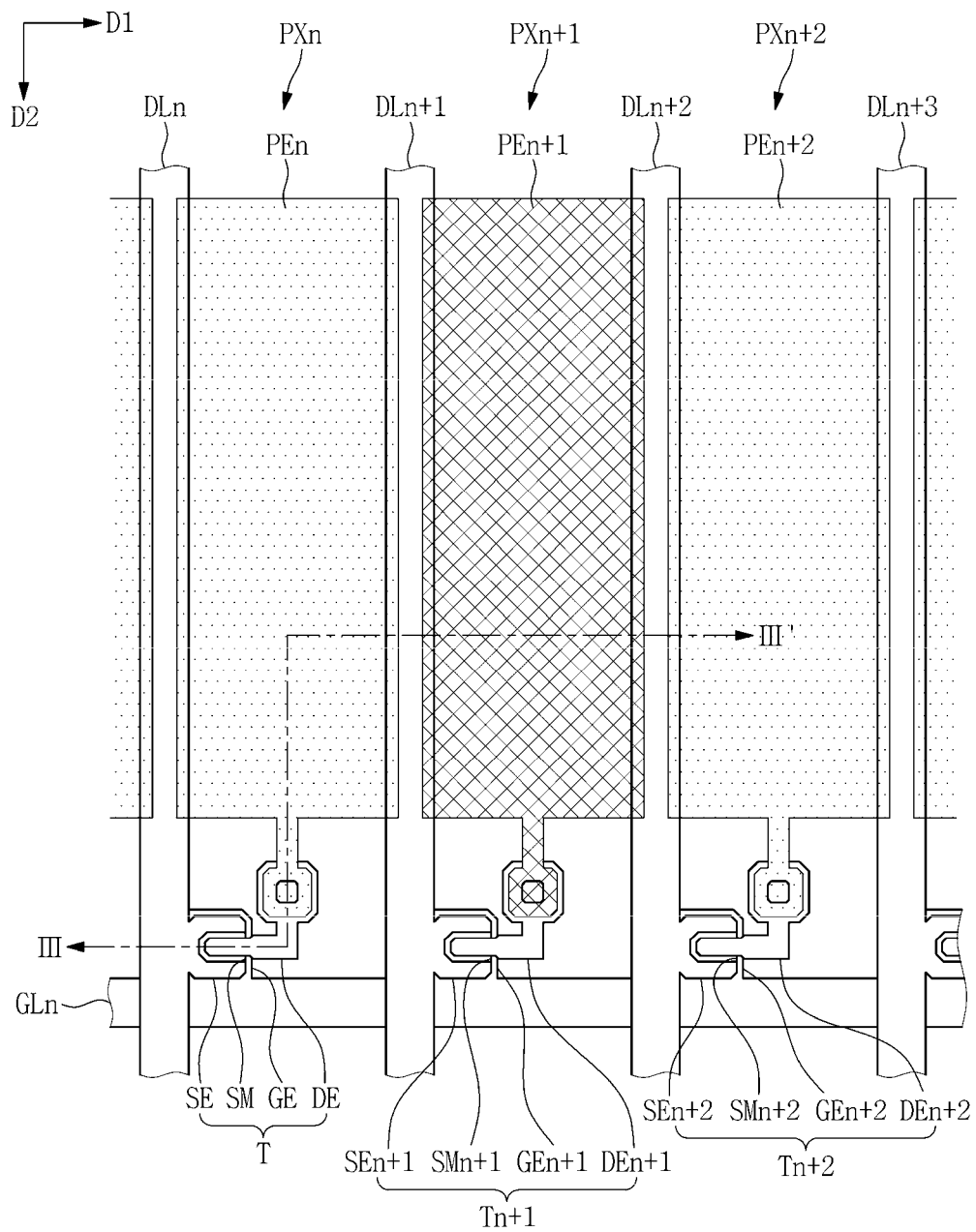
FIG. 8 is a schematic plan view illustrating another alternative exemplary embodiment of a display device.
Figure 9:
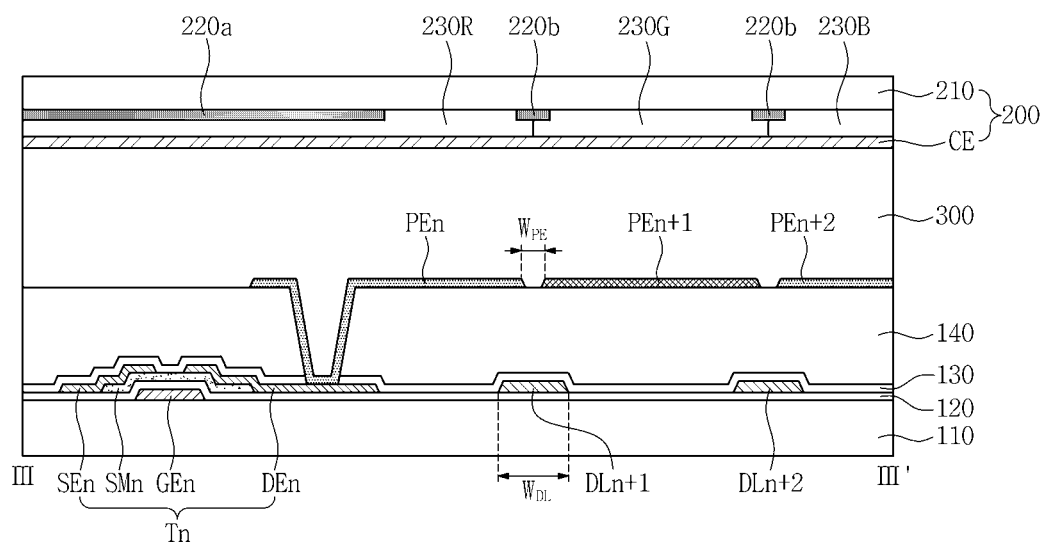
FIG. 9 is a cross-sectional view taken along line of FIG. 8.

FIG. 8 is a schematic plan view illustrating another alternative exemplary embodiment of a display device, and FIG. 9 is a cross-sectional view taken along line of FIG. 8. Descriptions with regard to configurations of an exemplary embodiment of a display device will not be repeated and thus be omitted in descriptions with regard to configurations of another alternative exemplary embodiment of a display device. FIG. 8 illustrates three pixels $PX_n$, $PX_{n+1}$, and $PX_{n+2}$ that are arranged in a row along a first direction D1, for ease of description.

Referring to FIGS. 8 and 9, another alternative exemplary embodiment of a display device includes the plurality of pixels $PX_n$, $PX_{n+1}$, and $PX_{n+2}$. Another alternative exemplary embodiment of a display device includes a display substrate 100, an opposing substrate 200, and a liquid crystal layer 300 between the display substrate 100 and the opposing substrate 200.

The display substrate 100 may include a first substrate 110, a gate wiring $GL_n$, $GE_n$, $GE_{n+1}$, and $GE_{n+2}$, a gate insulating layer 120, semiconductor layers $SM_n$, $SM_{n+1}$, and $SM_{n+2}$, a data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, an insulating interlayer 130, a passivation layer 140, first, second, and third pixel electrodes $PE_n$, $PE_{n+1}$, and $PE_{n+2}$, first, second, and third TFTs $T_n$, $T_{n+1}$, and $T_{n+2}$, or the like.

The first TFT $T_n$ may include a first gate electrode $GE_n$, a first semiconductor layer $SM_n$, a first source electrode $SE_n$, and a first drain electrode $DE_n$. The second TFT $T_{n+1}$ may include a second gate electrode $GE_{n+1}$, a second semiconductor layer $SM_{n+1}$, a second source electrode $SE_{n+1}$, and a second drain electrode $DE_{n+1}$. The third TFT $T_{n+2}$ may include a third gate electrode $GE_{n+2}$, a third semiconductor layer $SM_{n+2}$, a third source electrode $SE_{n+2}$, and a third drain electrode $DE_{n+2}$.

The gate wiring $GL_n$, $GE_n$, $GE_{n+1}$, and $GE_{n+2}$, the gate insulating layer 120, the semiconductor layers $SM_n$, $SM_{n+1}$, and $SM_{n+2}$, the data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, the insulating interlayer 130, and the passivation layer 140 are sequentially disposed on the first substrate 110.

The first, second, and third pixel electrodes $PE_n$, $PE_{n+1}$, $PE_{n+2}$ are disposed in different pixel areas, respectively, on the passivation layer 140. The first, second, and third pixel electrodes $PE_n$, $PE_{n+1}$, and $PE_{n+2}$ are disposed on substantially a same layer. The first, second, and third pixel electrodes $PE_n$, $PE_{n+1}$, and $PE_{n+2}$ may be disposed adjacent to one another with respect to respective ones of data lines $DL_{n+1}$ and $DL_{n+2}$.

For example, the first pixel electrode $PE_n$ may be disposed in a first column, the second pixel electrode $PE_{n+1}$ may be disposed in a second column, and the third pixel electrode $PE_{n+2}$ may be disposed in a third column; however, exemplary embodiments are not limited thereto.

Each of the first pixel electrode $PE_n$ and the second pixel electrode $PE_{n+1}$, adjacent to one another, may include different materials, respectively. For example, the first pixel electrode $PE_n$ and the second pixel electrode $PE_{n+1}$ may respectively include materials each having different etching ratios.

Similarly, the second pixel electrode $PE_{n+1}$ and the third pixel electrode $PE_{n+2}$, adjacent to one another, may include different materials. For example, the second pixel electrode $PE_{n+1}$ and the third pixel electrode $PE_{n+2}$ may respectively include materials each having different etching ratios.

It is assumed that in an exemplary embodiment of a display device, the first pixel electrode $PE_n$ and the third pixel electrode $PE_{n+2}$ include substantially a same material, and the second pixel electrode $PE_{n+1}$ includes a different material from a material included in the first pixel electrode $PE_n$ or the third pixel electrode $PE_{n+2}$; however, exemplary embodiments are not limited thereto.

Each of the first pixel electrode $PE_n$ and the second pixel electrode $PE_{n+1}$ may include at least one (or any combination) selected from the group consisting of: indium tin oxide (ITO), indium zinc oxide (IZO), indium tin zinc oxide (ITZO), aluminum zinc oxide (AZO), and amorphous indium tin oxide (a-ITO). For example, in a case where the first pixel electrode $PE_n$ is indium tin oxide (ITO), the second pixel electrode $PE_{n+1}$ may be amorphous indium tin oxide (a-ITO).

The first pixel electrode $PE_n$ and the second pixel electrode $PE_{n+1}$, which are adjacent to one another with respect to the data line $DL_{n+1}$, may respectively include materials each having different etching ratios and thus may have a significantly small distance from each other regardless of a resolution limit of an exposure.

For example, a distance $W_{PE}$ from a plane between the first pixel electrode $PE_n$ and the second pixel electrode $PE_{n+1}$ may be in a range of about 0.3 μm to about 1.0 μm.

In general, the data line $DL_{n+1}$ has a width $W_{DL}$ in a range of about 0.8 μm to about 1.2 μm, and thus the distance $W_{PE}$ between the first pixel electrode $PE_n$ and the second pixel electrode $PE_{n+1}$ is less than the width $W_{DL}$ of the data line $DL_{n+1}$. Accordingly, at least a portion of the first pixel electrode $PE_n$ and at least a portion of the second pixel electrode $PE_{n+1}$ may overlap the data line $DL_{n+1}$ from a plane.

FIGS. 10A, 10B, 10C, 10D, 10E, 10F, 10G, and 10H are views illustrating another alternative exemplary embodiment of a method of manufacturing a display device. Descriptions with regard to configurations of an exemplary embodiment of a method of manufacturing a display device will not be repeated and thus be omitted in descriptions with regard to configurations of another alternative exemplary embodiment of a method of manufacturing a display device.

Figure 10A:
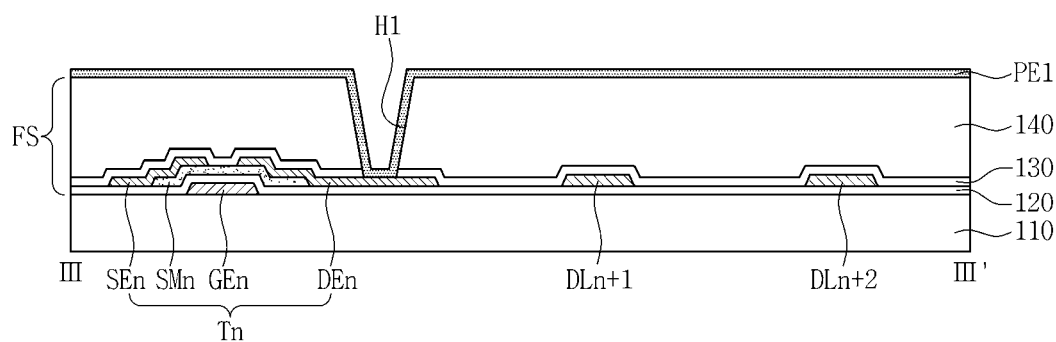
FIGS. 10A, 10B, 10C, 10D, 10E, 10F, 10G, and 10H are views illustrating another alternative exemplary embodiment of a method of manufacturing a display device.

Referring to FIGS. 8 and 10A, a film structure FS including a plurality of TFTs $T_n$, $T_{n+1}$, and $T_{n+2}$ is formed on a first substrate 110.

For example, a gate wiring $GL_n$, $GE_n$, $GE_{n+1}$, and $GE_{n+2}$, a gate insulating layer 120, semiconductor layers $SM_n$, $SM_{n+1}$, and $SM_{n+2}$, a data wiring $DL_n$, $DL_{n+1}$, $DL_{n+2}$, $DL_{n+3}$, $SE_n$, $SE_{n+1}$, $SE_{n+2}$, $DE_n$, $DE_{n+1}$, and $DE_{n+2}$, an insulating interlayer 130, and a passivation layer 140 may be sequentially formed on the first substrate 110.

Subsequently, a first contact hole H1 which passes through the insulating interlayer 130 and the passivation layer 140 to extend to and expose a portion of a first drain electrode $DE_n$ is defined. The first contact hole H1 may be defined in a pixel area to be formed with a first pixel electrode $PE_n$.

Subsequently, a first pixel electrode-forming material PE1 is formed on the passivation layer 140. The first pixel electrode-forming material PE1 passes through the first contact hole H1 to be connected to the first drain electrode $DE_n$. The first pixel electrode-forming material PE1 may include at least one (or any combination) selected from the group consisting of: indium tin oxide (ITO), indium zinc oxide (IZO), indium tin zinc oxide (ITZO), aluminum zinc oxide (AZO), and amorphous indium tin oxide (a-ITO).

Figure 10B:
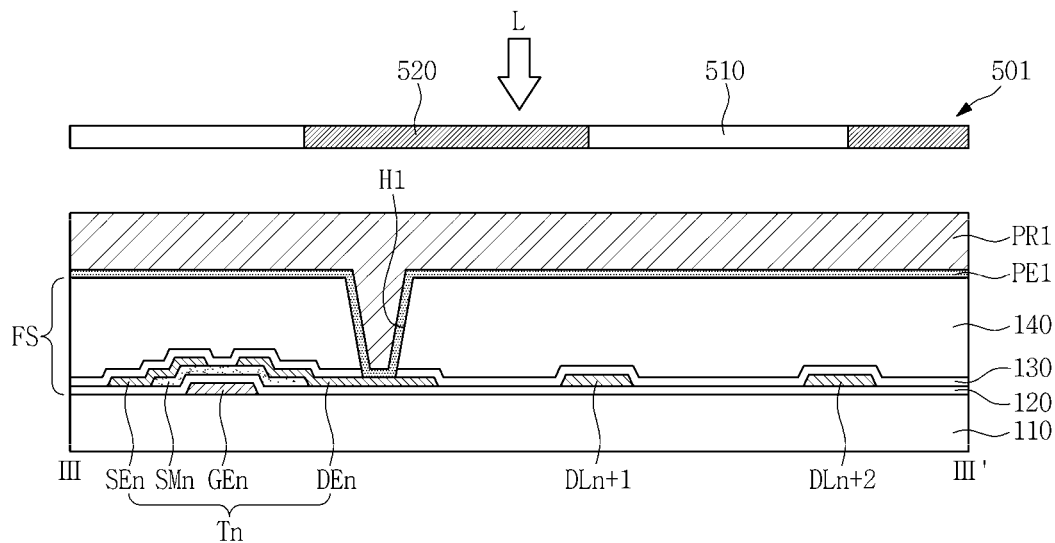

Referring to FIGS. 8 and 10B, a first photosensitive composition PR1 is coated over the first pixel electrode-forming material PE1. The first photosensitive composition PR1 may be a photosensitive resin composition of a positive type or a negative type. Hereinbelow, it is assumed that the first photosensitive composition PR1 is a positive type photosensitive composition in which an exposed portion is developed and an unexposed portion remains.

The first photosensitive composition PR1 may include a binder resin, a polymerizable monomer, a polymerizable oligomer, a pigment, a dispersant, and a photoinitiator, for example. The pigment may use a black pigment or a black resin.

A first exposure mask 501 is disposed above the first photosensitive composition PR1 to be spaced apart from the first photosensitive composition PR1, and a light L is irradiated to the first photosensitive composition PR1 through the first exposure mask 501 to perform light exposure.

The first exposure mask 501 includes a transmissive portion 510 and a light blocking portion 520. The transmissive portion 510 is disposed above an area except an area to be formed with the first pixel electrode $PE_n$ and a third pixel electrode $PE_{n+2}$, and the light blocking portion 520 is disposed above the area to be formed with the first pixel electrode $PE_n$ and the third pixel electrode $PE_{n+2}$.

Figure 10C:
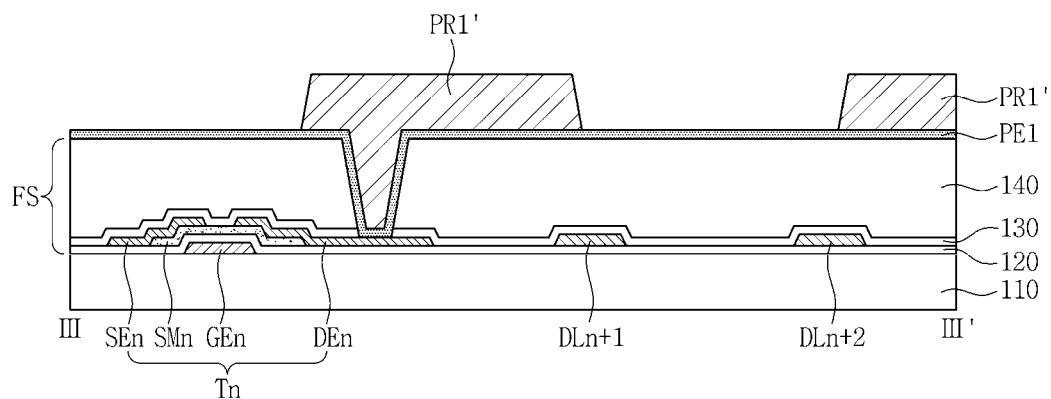

Referring to FIGS. 8 and 10C, an unexposed portion of the first photosensitive composition PR1 is developed, using a developing solution, and cured such that a first etching prevention layer PR1' is formed. That is, a portion of the first photosensitive composition PR1 below the transmissive portion 510 of the first exposure mask 501 is removed.

Figure 10D:
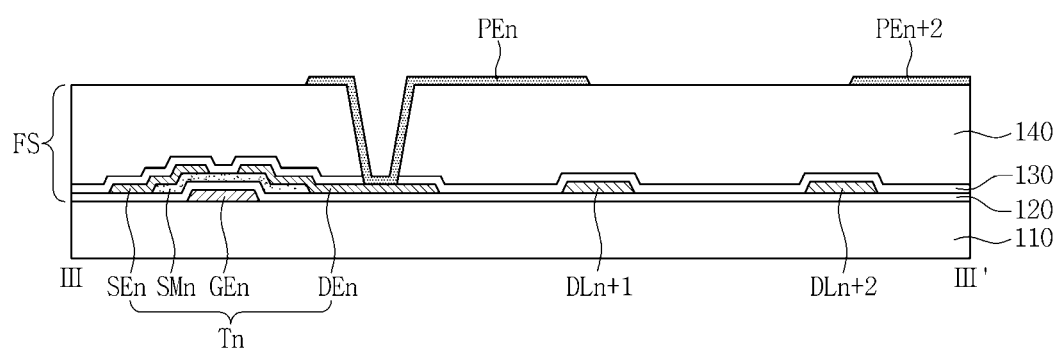

Referring to FIG. 10D, the first pixel electrode-forming material PE1 is patterned using a first etchant. A portion of the first pixel electrode-forming material PE1 on an area absent the first photosensitive composition PR1 is removed such that the first pixel electrode $PE_n$ and the third pixel electrode $PE_{n+2}$ are formed.

Figure 10E:
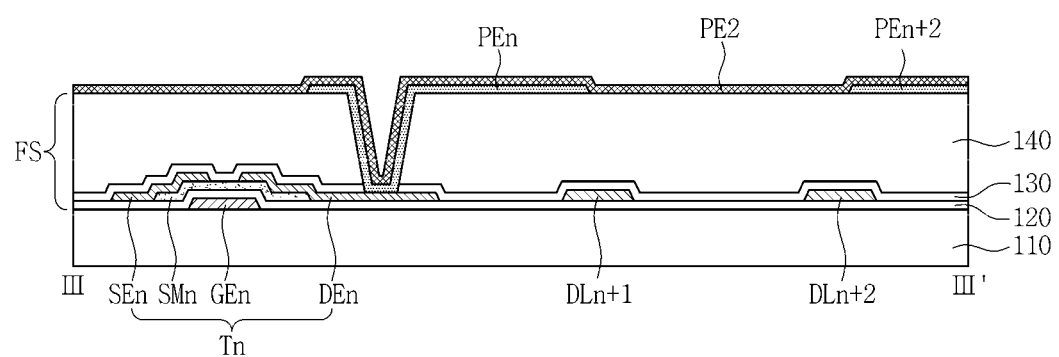

Referring to FIGS. 8 and 10E, a second pixel electrode-forming material PE2 is formed on the passivation layer 140 on which the first pixel electrode $PE_n$ and the third pixel electrode $PE_{n+2}$ are formed.

The second pixel electrode-forming material PE2 includes a different material from a material included in the first pixel electrode-forming material PE1. For example, the second pixel electrode-forming material PE2 may include a material having a different etching ratio from an etching ratio of a material included in the first pixel electrode-forming material PE1.

Figure 10F:
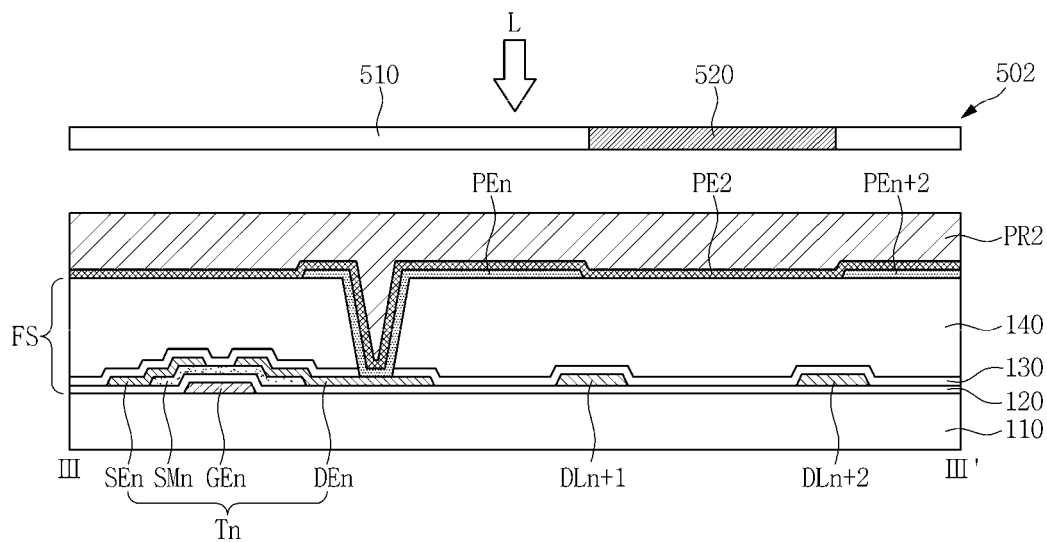

Referring to FIGS. 8 and 10F, a second photosensitive composition PR2 is coated on the second pixel electrode-forming material PE2. The second photosensitive composition PR2 may be a photosensitive resin composition of a positive type or a negative type. Hereinbelow, it is assumed that the second photosensitive composition PR2 is a positive type photosensitive composition in which an exposed portion is developed and an unexposed portion remains.

A second exposure mask 502 is disposed above the second photosensitive composition PR2 to be spaced apart from the second photosensitive composition PR2, and a light L is irradiated to the second photosensitive composition PR2 through the second exposure mask 502 to perform light exposure.

The second exposure mask 502 includes a transmissive portion 510 and a light blocking portion 520. The transmissive portion 510 is disposed above an area except an area to be formed with a second pixel electrode $PE_{n+1}$, and the light blocking portion 520 is disposed above the area to be formed with the second pixel electrode $PE_{n+1}$.

Figure 10G:
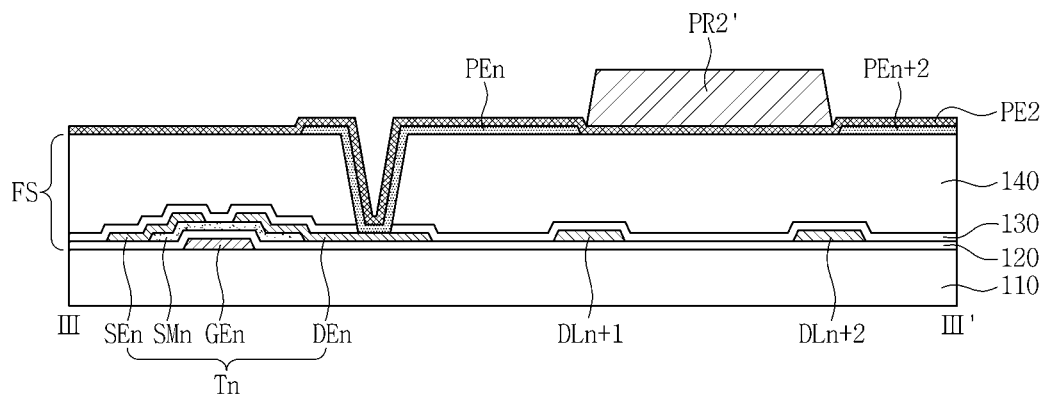

Referring to FIGS. 8 and 10G, an unexposed portion of the second photosensitive composition PR2 is developed, using a developing solution, and cured such that a second etching prevention layer PR2' is formed. That is, a portion of the second photosensitive composition PR2 below the transmissive portion 510 of the second exposure mask 502 is removed.

In such an exemplary embodiment, the second etching prevention layer PR2' is formed to be spaced apart from the first pixel electrode $PE_n$ and the third pixel electrode $PE_{n+2}$ at a distance in a range of about 0.3 µm to about 1.0 µm from a plane.

Figure 10H:
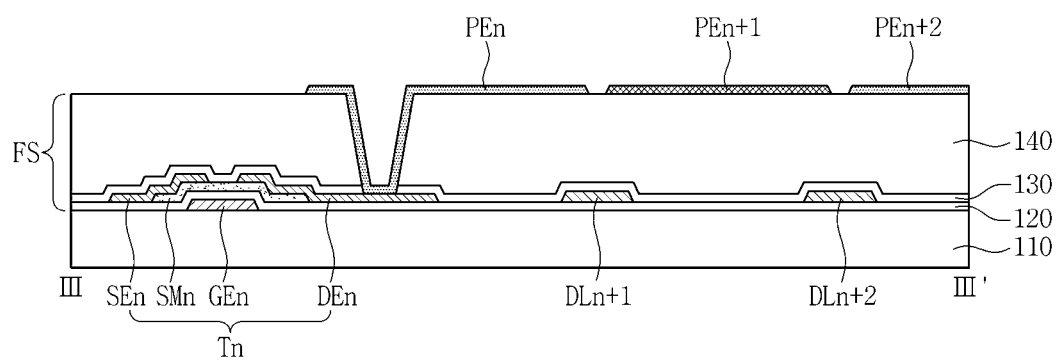

Referring to FIGS. 8 and 10H, the second pixel electrode-forming material PE2 is patterned using a second etchant. A portion of the second pixel electrode-forming material PE2 on an area absent the second photosensitive composition PR2 is removed such that the second pixel electrode $PE_{n+1}$ is formed. The second etchant may have a different etching ratio than that of the first etchant. The first etchant and the second etchant may be a combined material of hydrochloric acid, acetic acid, deionized water, and a surfactant.

As such, in another alternative exemplary embodiment of a display device, the first pixel electrode $PE_n$ and the second pixel electrode $PE_{n+1}$, adjacent to one another, respectively include materials each having different etching ratios such that the first pixel electrode $PE_n$ and the second pixel electrode $PE_{n+1}$ may have a significantly small distance from each other regardless of a resolution limit of an exposure.

As set forth hereinabove, in one or more exemplary embodiments of a display device, a distance among pixel electrodes may be less than or equal to a resolution limit of an exposure and thus display devices having an ultra-high resolution of about 2000 pixel per inch (ppi) or higher may be realized.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the inventive concept.

What is claimed is:

1. A display device comprising:
    a first substrate and a second substrate comprising a plurality of pixel areas and opposing each other;
    a liquid crystal layer between the first substrate and the second substrate;
    a first pixel electrode on the first substrate;
    a first insulating layer on the first pixel electrode, the first pixel electrode being between the first substrate and the first insulating layer;
    a second pixel electrode on the first insulating layer and in a second pixel area adjacent to a first pixel area in which the first pixel electrode is disposed, the first insulating layer being between the second pixel electrode and the first substrate;
    a common electrode on the second substrate, the common electrode being a whole planar electrode extending across the plurality of pixel areas,
    wherein the first pixel electrode and the second pixel electrode are spaced apart from each other and are non-overlapping in a plan view; and
    a gate line extending in a first direction and a data line extending in a second direction which intersects the first direction, wherein a distance between the first pixel electrode and the second pixel electrode is less than a width of the data line in the first direction.

2. The display device as claimed in claim 1, wherein the first pixel electrode and the second pixel electrode have substantially a same shape.

3. The display device as claimed in claim 1, wherein at least a portion of the first pixel electrode and at least a portion of the second pixel electrode overlap the data line.

4. The display device as claimed in claim 1, wherein a distance between the first pixel electrode and the second pixel electrode is in a range of about 0.3 µm to about 1.0 µm.

5. The display device as claimed in claim 1, further comprising a first black matrix extending along the gate line.

6. The display device as claimed in claim 5, further comprising a second black matrix extending along the data line.

7. The display device as claimed in claim 6, wherein the second black matrix has a smaller width than a width of the data line.

8. The display device as claimed in claim 1, wherein the first insulating layer entirely covers the first pixel electrode.

9. The display device as claimed in claim 1, wherein the entirety of the second pixel electrode overlaps with the first insulating layer in a plan view.

* * * * *